(12) United States Patent
Hong et al.

(10) Patent No.: US 11,169,305 B2
(45) Date of Patent: Nov. 9, 2021

(54) OPTICAL ELEMENT, MOBILE PHONE COVER PLATE AND MOLD FOR MANUFACTURING THE OPTICAL ELEMENT

(71) Applicant: Shine Optoelectronics (Kunshan) Co., Ltd., Kunshan (CN)

(72) Inventors: Shen Hong, Kunshan (CN); Yulong Gao, Kunshan (CN); Hongwei Kang, Kunshan (CN); Su Shen, Kunshan (CN)

(73) Assignee: SHINE OPTOELECTRONICS (KUNSHAN) CO., LTD., Kunshan (CN)

( * ) Notice: Subject to any disclaimer, the term of this patent is extended or adjusted under 35 U.S.C. 154(b) by 61 days.

(21) Appl. No.: 16/685,961

(22) Filed: Nov. 15, 2019

(65) Prior Publication Data

US 2020/0116901 A1 Apr. 16, 2020

Related U.S. Application Data

(63) Continuation of application No. PCT/CN2018/086818, filed on May 15, 2018.

(30) Foreign Application Priority Data

May 16, 2017 (CN) .......................... 201710344187.0

(51) Int. Cl.
*G02B 3/08* (2006.01)
*G02B 3/00* (2006.01)
(Continued)

(52) U.S. Cl.
CPC ........ *G02B 3/0043* (2013.01); *B29D 11/0048* (2013.01); *H04M 1/026* (2013.01)

(58) Field of Classification Search
CPC ....................................................... G02B 3/08
See application file for complete search history.

(56) References Cited

U.S. PATENT DOCUMENTS

| 2008/0206495 | A1* | 8/2008 | Korechika | ............... | G02B 5/09 |
| | | | | | 428/30 |
| 2009/0317595 | A1 | 12/2009 | Brehm et al. | | |

(Continued)

FOREIGN PATENT DOCUMENTS

| CN | 101382605 A | 3/2009 |
| CN | 103068192 A | 4/2013 |

(Continued)

OTHER PUBLICATIONS

Chinese Search Report dated Jun. 14, 2019, for Chinese Patent Application No. 201710344187.0 (English translation included).

(Continued)

*Primary Examiner* — Olisa Anwah
(74) *Attorney, Agent, or Firm* — Hamilton, Brook, Smith & Reynolds, P.C.

(57) ABSTRACT

An optical element, a mobile phone cover plate provided with the optical element, and a mold for manufacturing the optical element. The optical element comprising at least two types of arranged optical units, the optical units comprising optical structures producing light shadow effects; wherein a light shadow effect produced by an optical structure of one type of optical units is different from a light shadow effect produced by an optical structure of another type of optical units. The optical units are arranged and there are at least two types of different optical units, the optical structures there of being able to produce different light shadow effects, so that the optical element has a good visual effect, and when (Continued)

it is applied in the field of decoration, it is able to enhance a decoration effect, and make the decoration rich in visual senses and pictures vivid.

19 Claims, 5 Drawing Sheets (51) Int. Cl.
  *B29D 11/00* (2006.01)
  *H04M 1/02* (2006.01)

(56) References Cited

U.S. PATENT DOCUMENTS

| | | | |
|---|---|---|---|
| 2013/0059117 | A1 | 3/2013 | Hill |
| 2017/0082787 | A1* | 3/2017 | Yashiki ............... G02B 5/08 |
| 2017/0129272 | A1* | 5/2017 | Rich ............... G02B 30/00 |
| 2017/0200881 | A1* | 7/2017 | Gdala ............... H01L 41/09 |

FOREIGN PATENT DOCUMENTS

| | | |
|---|---|---|
| CN | 105015215 A | 11/2015 |
| CN | 105319628 A | 2/2016 |
| CN | 105388543 A | 3/2016 |
| CN | 205344004 U | 6/2016 |
| CN | 205365001 U | 7/2016 |
| CN | 106324726 A | 1/2017 |
| CN | 205902240 U | 1/2017 |
| CN | 205902241 U | 1/2017 |
| CN | 206023857 U | 3/2017 |
| CN | 206100097 U | 4/2017 |
| JP | 2010-500186 A | 1/2010 |
| WO | 2018/210222 A1 | 11/2018 |

OTHER PUBLICATIONS

International Search Report issued in counterpart Chinese Application No. PCT/CN2018/086818, dated May 15, 2018 (English translation included).
Written Opinion for Int'l Application No. PCT/CN2018/086818, titled: Optical Element, Mobile Phone Cover Plate and Mold for Manufacturing the Optical Element, dated Aug. 21, 2018 (English Translation Attached).
International Preliminary Report on Patentability or Int'l Application No. PCT/CN2018/086818, titled: Optical Element, Mobile Phone Cover Plate and Mold for Manufacturing the Optical Element, dated Nov. 19, 2019.
Second Chinese Office Action for Chinese Application No. 201710344187.0, titled: Optical Element, Mobile Phone Cover and Mould for Preparing Optical Element, dated Jan. 13, 2020 (English Translation Attached).
Chinese Supplementary Search Report for Chinese Application No. 201710344187.0, titled: Optical Element, Mobile Phone Cover and Mould for Preparing Optical Element, dated Jan. 13, 2020 (English Translation Attached).
Indian Examination Report for Indian Application No. 201927050275, dated Feb. 10, 2021.

\* cited by examiner

OPTICAL ELEMENT, MOBILE PHONE COVER PLATE AND MOLD FOR MANUFACTURING THE OPTICAL ELEMENT

CROSS REFERENCE TO RELATED APPLICATION

This application is continuation of International Application No. PCT/CN2018/086818, which designates the United States and was filed on May 15, 2018, published in Chinese, which claims priority to Chinese Application No. 201710344187.0, entitled "Optical Element, Mobile Phone Cover Plate and Mould for Manufacturing the Optical Element," filed May 16, 2017. The entire teachings of the above applications are incorporated herein by reference.

TECHNICAL FIELD

This disclosure relates to the field of optics, and in particular to an optical element, mobile phone cover plate and mold for manufacturing the optical element.

BACKGROUND ART

At present, the consumer electronics industry is developing faster and faster, and various manufacturers are constantly seeking technological innovation and functional innovation to cater to the development trends of environmental protection, energy conservation and differentiation. The design of consumer electronics has not only been limited to the perfection of functions, many designers have turned their attention to the design of the appearance of consumer electronics. Taking a mobile phone as an example, a mobile phone cover plate not only functions to protect the parts inside the mobile phone, but also serves to beautify and decorate mobile phone. An excellent design of a mobile phone cover plate may not only increase the value of the mobile phone, but also improve user experiences. It increases a range of choice of shapes of mobile phones, and makes mobile phones more popular to users. However, the current decorative design of the mobile phone cover plates is focused on replacement of materials (such as glass, metal, plastic) or the replacement of a single color of a color layer, resulting in that visual senses are unitary and pictures are not sufficiently vivid, so that a decorative effect is not good.

The same defect also exists in design of appearance in other field, such as household appliances, furnitures, automobiles, and cosmetics packaging, etc.

SUMMARY OF THE INVENTION

Due to the above reasons, there is a need to provide an optical element, which has a relatively good visual effect.

A technical solution of this disclosure is as follows.

A optical element, including at least two types of arranged optical units, the optical units including optical structures producing light shadow effects; wherein a light shadow effect produced by an optical structure of one type of optical units is different from a light shadow effect produced by an optical structure of another type of optical units.

In an embodiment, the at least two types of optical units are spacedly arranged, or the at least two types of optical units are alternately arranged, or the at least two types of optical units are sequentially arranged, or the at least two types of optical units are regularly arranged, or the at least two types of optical units are randomly arranged.

In an embodiment, one type of optical units in the at least two types of optical units are spacedly arranged in arrangement of another type of optical units, or any two neighboring optical units are different from each other, or the at least two types of optical units are arranged in a predetermined order, or the at least two types of optical units are arranged in a predetermined regularity.

In an embodiment, the optical structures are of linear cylindrical mirrors or curved lenses.

In an embodiment, two neighboring curved lenses are disposes so that they are mirror images of each other.

In an embodiment, a plurality of curved lenses are arranged in a line or in a curve, or a plurality of curved lenses are scattered out.

In an embodiment, an interval between neighboring curved lenses is of 0, or a fixed value, or a variable value, and all intervals between curved lenses in the same row are of fixed values, or are gradually variable, or are regularly variable, or are randomly variable.

In an embodiment, the optical structures of the optical units are groups of small short lines including a plurality of small short lines.

In an embodiment, the small short lines are linear cylindrical mirrors or curved lenses.

In an embodiment, small short lines in the same optical structure are distributed on a line, a curve, or an arc, or central points of small short lines in the same optical structure are distributed on a line, a curve, or an arc.

In an embodiment, the small short lines in the same optical structure are arranged offset from the horizontal direction, or the small short lines in the same optical structure are arranged offset from their respective central points.

In an embodiment, offset angles of a number of small short lines in the same optical structure are identical, gradually variable, incrementally increasing, regularly variable, or randomly variable.

In an embodiment, offset angles of at least a part of small short lines of optical structures of different optical elements are different.

In an embodiment, optical structures of a plurality of optical elements include one, two or three types of linear cylindrical mirrors, curved lenses and small short lines.

In an embodiment, at least one parameter of widths, or heights, or cross-sectional shapes, of linear cylindrical mirrors of optical structures of different optical elements are different.

In an embodiment, at least one parameter of widths, or heights, or curvatures, or cross-sectional shapes, of curved lenses of optical structures of different optical elements is different.

In an embodiment, at least one parameter of widths, or heights, or offset angles, or numbers, or cross-sectional shapes, of groups of small short lines of optical structures of different optical elements is different.

This application further discloses a mobile phone cover plate, including the optical element as described above.

This application further discloses a mold for manufacturing the above optical element, including at least two types of arranged texture units, the texture units including texture structures, and different texture units including different texture structures.

An advantage of this disclosure exists in that the optical units are arranged and there are at least two types of different optical units, the optical structures thereof being able to produce different light shadow effects, so that the optical element has a good visual effect, and when it is applied in the field of decoration, it is able to enhance a decoration effect, and make the decoration rich in visual senses and pictures vivid.

DETAILED DESCRIPTION OF THE INVENTION

For this disclosure to be understood, this disclosure shall be fully described below with reference to the accompanying drawings. Better embodiments of this disclosure are given in the accompanying drawings; however, this disclosure may be carried out in various ways, which are not limited to those described below. Rather, these embodiments are provided so that the contents disclosed in this disclosure are understood more thoroughly and completely.

All technical and scientific terms used herein have the same meanings as commonly understood by those skilled in the art to which this disclosure pertains, unless otherwise defined. The terminology used in the description of this disclosure is for the purpose of describing particular embodiments and is not intended to limit this disclosure. The term "and/or" as used herein includes any and all combinations of one or more of the associated listed items.

This disclosure provides an optical element, including at least two types of arranged optical units, the optical units comprising optical structures producing light shadow effects; wherein a light shadow effect produced by an optical structure of one type of optical units is different from a light shadow effect produced by an optical structure of another type of optical units. The optical units are arranged and there are at least two types of different optical units, the optical structures thereof being able to produce different light shadow effects, so that the optical element has a good visual effect, and when it is applied in the field of decoration, it is able to enhance a decoration effect, and make the decoration rich in visual senses and pictures vivid.

Preferably, the at least two types of optical units are spacedly arranged. One type of optical units are inserted into the arrangement of another type of optical units, and at least one type of optical units have two optical units and are arranged by being spaced apart by another type of optical units. For example, there are two types of optical units, one or two optical units of one type of optical units are sequentially arranged spaced apart by one or two optical units of the other type of optical units; or there are three types of optical units, one optical unit of one type of optical units is sequentially arranged spaced apart by one optical unit of another type of optical units and one optical unit of a further type of optical units.

Preferably, the at least two types of optical units are alternately arranged. Any two neighboring optical units are different from each other. For example, there are two optical units, a first optical unit and a second optical unit. Wherein, the first optical unit and the second optical unit are arranged so that the first optical unit follows the second optical unit and the second optical unit follows the first optical unit; or there are three optical units, and one optical unit follows one of the other two optical units.

Preferably, the at least two types of optical units are sequentially arranged. Several types of optical units are arranged in a predetermined order. For example, there are two types of optical units, which are arrange in an order of a first type of optical units, a second type of optical units, the first type of optical units, the second type of optical units; or there are three types of optical units, which are arrange in an order of a first type of optical units, a second type of optical units, a third type of optical units, the first type of optical units, the second type of optical units, the third type of optical units. Specially, there are N rows of arranged optical units, which have N types of optical units, that is, optical units of each row are different.

Preferably, the at least two types of optical units are regularly arranged. A predetermined regularity may be found in the arrangement of the optical units. For example, there are two types of optical units, and in the arrangement of which a regularity of a first type of optical units, a second type of optical units, the first type of optical units, the second type of optical units, or a regularity of a first type of optical units, a second type of optical units, the second type of optical units, the first type of optical units, the second type of optical units, the second type of optical units, etc., may be found.

Preferably, the at least two types of optical units are randomly arranged. No predetermined regularity may be found in the arrangement of the optical units, and a plurality of optical units are randomly arranged.

Preferably, the above arrangement is embodied in the same row or the same column. The same row or the same column may be arranged on a line, a curve, or an arc. For example, the optical units are arranged scattering from respective centers along an arc.

Preferably, the optical structures are of curved lenses. A plurality of curved lenses are arranged in a line or in a curve, or a plurality of curved lenses are scattered out, or two neighboring curved lenses are mirror images of each other. An interval between neighboring curved lenses is of 0, or a fixed value, or a variable value, and all intervals between curved lenses in the same row are of fixed values, or are gradually variable, or are regularly variable, or are randomly variable.

Preferably, the optical structures of the optical units are groups of small short lines including a plurality of small short lines. The small short lines are linear cylindrical mirrors or curved lenses. Preferably, the small short lines are linear cylindrical mirrors with lengths between 10 μm and 300 μm. Small short lines in the same optical structure are distributed on a line, a curve, or an arc. Preferably, central points of small short lines in the same optical structure are distributed on a line, a curve, or an arc. The small short lines in the same optical structure are arranged offset from the horizontal direction. Preferably, the small short lines in the same optical structure are arranged offset from their respective central points. Offset angles of a number of small short lines in the same optical structure are identical, gradually variable, incrementally increasing, progressively decreased, regularly variable, or randomly variable. Offset angles of small short lines in the same optical unit may be identical, or the small short lines may be offset in an ascending order or a descending order. Offset angles of at least a part of small short lines of optical structures of different optical elements are different.

Preferably, optical structures of a plurality of optical elements include one, two or three types of linear cylindrical mirrors, curved lenses and small short lines. At least one parameter of widths, or heights, or cross-sectional shapes, of linear cylindrical mirrors of optical structures of different optical elements are different. For example, cross-sectional shapes of linear cylindrical mirrors of optical structures of two different optical elements are all semi-circular, but radii thereof are different. At least one parameter of widths, or heights, or curvatures, or cross-sectional shapes, of curved lenses of optical structures of different optical elements is different. For example, one of curved lenses of optical structures of two different optical elements is of a $2\pi$ sinusoidal curve, and another one is of a $1\pi$ cosine curve. At least one parameter of widths, or heights, or offset angles, or numbers, or cross-sectional shapes, of groups of small short lines of optical structures of different optical elements are different. For example, offset angles of groups of small short lines of optical structures of different optical elements are different, one type which being offset by 0 degree to 180 degrees, and another type being offset by 180 degrees to 0 degree.

The optical element further includes a carrier layer, an optical layer disposed at a side of the carrier layer, a substrate layer disposed at an opposite side of the carrier layer, a reflective layer covering the optical layer and a colored layer covering the reflective layer, the optical layer including optical units.

This application further discloses a mobile phone cover plate, including the above optical element. Preferably, the mobile phone cover plate is a mobile phone back cover, so that the mobile phone back cover has a better decoration effect.

This application further discloses a mold for manufacturing the above optical element, the mold including at least two types of arranged texture units, the texture units including texture structures, different texture units including different texture structures. And optical structure of the optical element and the texture structures of the mold are correspondingly disposed.

The optical element of this disclosure shall be described below by way of examples with reference to the accompanying drawings.

Referring to FIGS. 1-5, in which cross sections of the optical element of this disclosure are shown.

Figure 1:
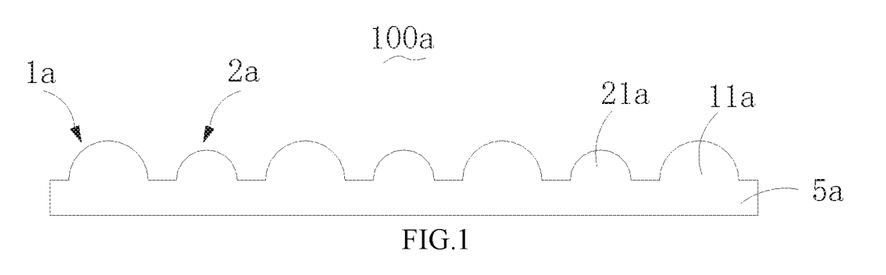
FIG. 1 is a schematic diagram of a cross section of the optical element of this disclosure.

Referring to FIG. 1, an optical element 100a is disclosed, which includes two types of arranged optical units, a first optical unit 1a and a second optical unit 2a. The first optical unit 1a includes an optical structure 11a producing light shadow effects, and the second optical unit 2a includes an optical structure 21a producing light shadow effects. The first optical unit 1a and the second optical unit 2a are spacedly arranged, and the second optical unit 2a is inserted into arrangement of the first optical unit 1a. That is, the first optical unit 1a and the second optical unit 2a are alternately arranged. That is, the first optical unit 1a and the second optical unit 2a are sequentially arranged. That is, the first optical unit 1a and the second optical unit 2a are arranged in a sequential and alternate regularity. The first optical structure 11a is a linear cylindrical mirror, and its cross section is semi-circular. The second optical structure 21a is a linear cylindrical mirror, and its cross section is semi-circular. A radius of the first optical structure 11a is greater than a radius of the second optical structure 21a. The first optical structure 11a and the second optical structure 21a are disposed in a row. The optical element 100a further includes a carrier layer 5a and an optical layer disposed on the carrier layer 5a, the optical layer including a first optical unit 1a and a second optical unit 2a. The carrier layer 5a may be a residual adhesive layer (a residual layer obtained after imprinting the optical layer), or may be a substrate layer (such as a PET layer, or a glass layer, etc.). In other embodiments, the first optical structure 11a is a curved lens, the second optical structure 21a is a curved lens, and orientations of curves of first and second optical structures are identical; or first and second optical structures are different curves; and furthermore, all optical units of the optical element 100a are curved lenses with different curvatures or radii. Or one of the first optical structure 11a and the second optical structure 21a is a linear cylindrical mirror, and the other one is a curved lens.

Figure 2:
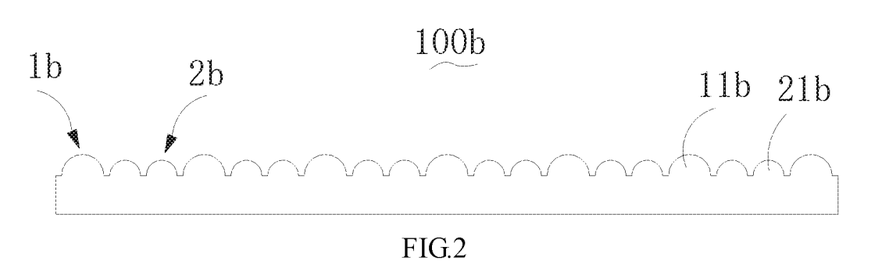
FIG. 2 is another schematic diagram of the cross section of the optical element of this disclosure.

Referring to FIG. 2, an optical element 100b includes two types of optical units, first optical units 1b and second optical units 2b. In the same row, the first optical units 1b are spacedly disposed in the second optical units 2b. That is, one first optical unit 1b and two second optical units 2b are regularly arranged in turn. A first optical unit 1b includes a first optical structure 11b, and a second optical unit 21b includes a second optical structure 21b. The first optical structure 11b is a linear cylindrical mirror, and its cross section is semi-circular. The second optical structure 21b is a linear cylindrical mirror, and its cross section is semi-circular. A radius of the first optical structure 11b is greater than a radius of the second optical structure 21b. In other embodiments, the optical element 100b includes three optical units: a first optical unit, a second optical unit, and a third optical unit. The first optical unit, the second optical unit and the third optical unit are spacedly arranged, that is, sequentially arranged, that is, alternately arranged, that is, regularly arranged. Or, the first optical structure 11b and/or the second optical structure 21b are curved lenses, and there may be multiple corresponding arrangements.

Figure 3:
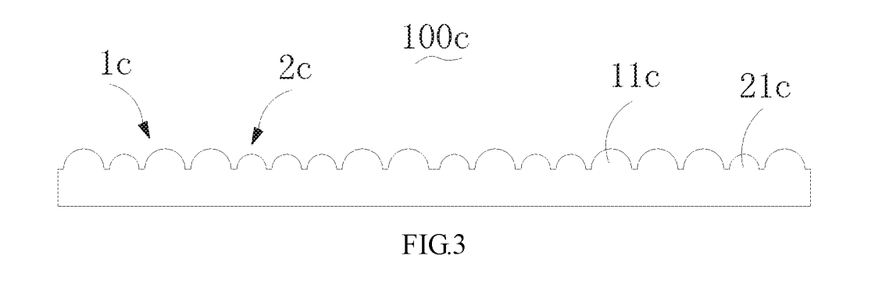
FIG. 3 is a further schematic diagram of the cross section of the optical element of this disclosure.

Referring to FIG. 3, an optical element 100c includes two optical units: a first optical unit 1c and a second optical unit 2c. The first optical unit 1c and the second optical unit 2c are randomly arranged. The first optical unit 1c includes a first optical structure 11c, and the second optical unit 2c includes a second optical structure 21c. The first optical structure 11c and the second optical structure 21c are both linear cylindrical mirrors, their cross sections are semi-circular, and their radii are inconsistent. In other embodiments, the first optical structure 11c and/or the second optical structure 21c are/is curved lens(es).

Figure 4:
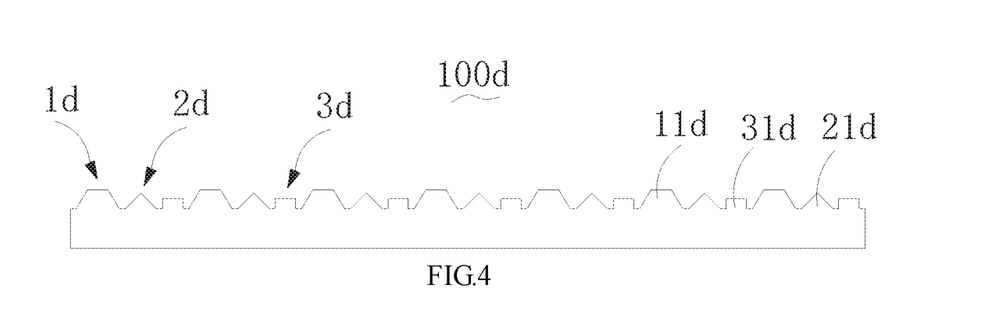
FIG. 4 is yet a further schematic diagram of the cross section of the optical element of this disclosure.

Referring to FIG. 4, an optical element 100d includes three optical elements: a first optical unit 1d, a second optical unit 2d, and a third optical unit 3d. The first, second and third optical units are sequentially arranged, that is, regularly arranged. The first optical unit 1d includes a first optical structure 11d which is a linear cylindrical mirror and has a trapezoidal cross-sectional shape. The second optical unit 2d includes a second optical structure 21d which is a linear cylindrical mirror and has a triangular cross section. The third optical unit 3d includes a third optical structure 31d which is a linear cylindrical mirror and has a rectangular cross section. A height of the first optical structure 11d is greater than a height of the second optical structure 21d and is greater than a height of the third optical structure 31d. In other embodiments, the first optical structure 11d and/or the second optical structure 21d and/or the third optical structure 31d are/is curved lens(es), and arrangements thereof are as described above.

Figure 5:
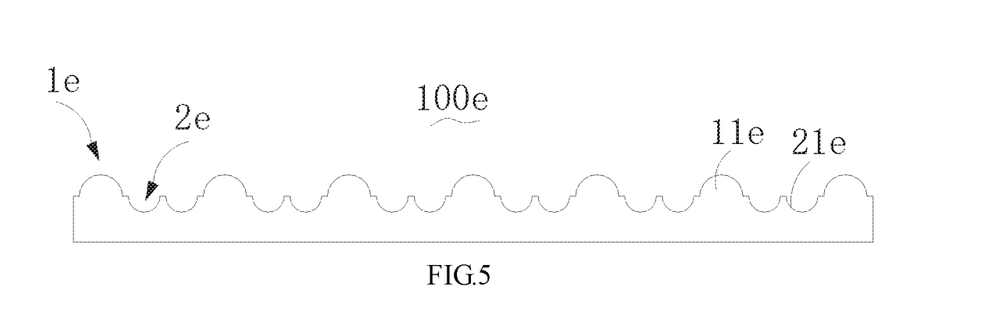
FIG. 5 is yet a further schematic diagram of the cross section of the optical element of this disclosure.

Referring to FIG. 5, an optical element 100e includes two types of optical units: first optical units 1e and second optical units 2e. The first optical units 1e are inserted into the second optical units 2e and spacedly arranged, that is, a first optical unit 1e and two second optical units 2e are regularly arranged. A first optical unit 1e includes a first optical structure 11e which is a linear cylindrical mirror and has a semicircular cross-sectional shape. A second optical unit 2e includes a second optical structure 21e which is a linear cylindrical mirror and has a semicircular cross-sectional shape. A radius of the first optical structure 11e is larger than a radius of the second optical structure 21e, the first optical structure is a convex structure, and the second optical structure is a concave structure. Reference may be to the description of the optical structure 100b for other embodiments.

Referring to FIGS. 6-11, in which schematic diagrams of arrangement of the optical units of the optical element of this disclosure are shown.

Figure 6:
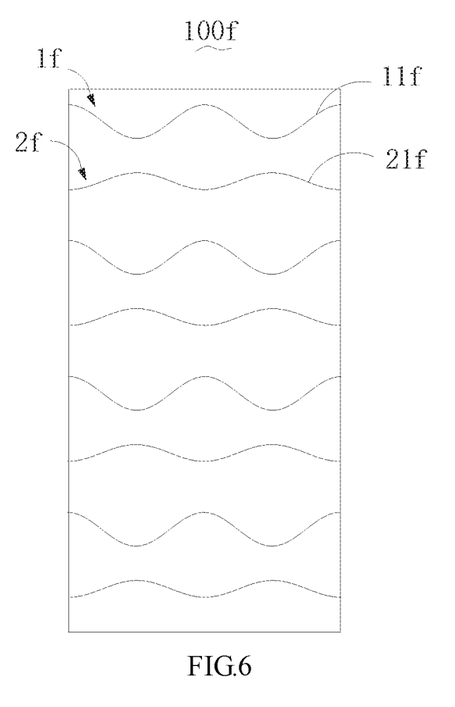
FIG. 6 is a schematic diagram of an arrangement of the optical units of the optical element of this disclosure.

Referring to FIG. 6, the optical element 100f of this disclosure includes two types of optical units: first optical units 1f and second optical units 2f. The first optical units 1f include a first optical structure 11f producing a light-shadow effect, and the second optical units 2f include a second optical structure 21f producing a light-shadow effect. The light-shadow effect produced by the first optical structure 11f of the first optical units 1f is different from the light-shadow effect produced by the second optical structure 21f of the second optical units 2f. A plurality of first optical units 1f and a plurality of second optical units 2f are arranged in a row. The first optical units 1f and the second optical units 2f are spacedly arranged, and the second optical units 2f are inserted into the first optical units 1f; that is, the first optical units 1f and the second optical units 2f are alternately arranged; that is, the first optical units 1f and the second optical units 2f are arranged in order, that is, the first optical units 1f and the second optical units 2f are regularly arranged. The first optical structure 11f is a curved lens, and the second optical structure 21f is a curved lens. A curvature of the first optical structure 11f is different from a curvature of the second optical structure 21f. In other embodiments, cross-sectional shapes, heights and widths of the first optical structure and the second optical structure may be identical or different, and various arrangements may be extended accordingly.

Figure 7:
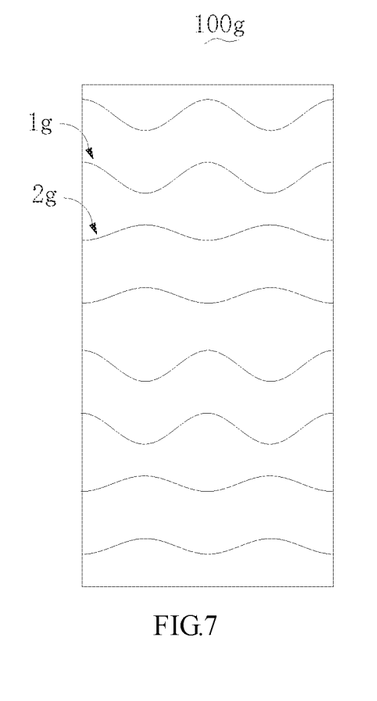
FIG. 7 is another schematic diagram of the arrangement of the optical units of the optical element of this disclosure.

Referring to FIG. 7, an optical element 100g is different from the optical element 100f in that first optical units 1g and second optical units 2g are arranged at two-by-two intervals, that is, they are alternately arranged two by two, that is, they are sequentially arranged two by two, that is, they are regularly arranged two by two. In other embodiments, they may be arranged three by three, four by four, or five by five, etc.

Figure 8:
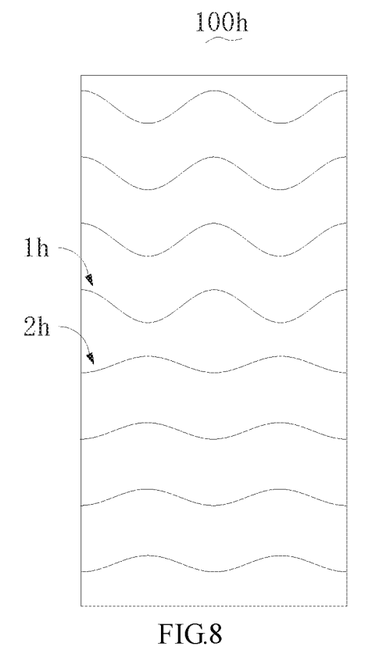
FIG. 8 is a further schematic diagram of the arrangement of the optical units of the optical element of this disclosure.

Referring to FIG. 8, an optical element 100h is different from the optical element 100f in that all optical units in a row are divided into two groups, a former group and a latter group. The former group is arranged first optical units 1h, and the latter group is arranged second optical units 2h. The first optical units 1h and the second optical units 2h are alternately arranged, that is, regularly arranged.

Figure 9:
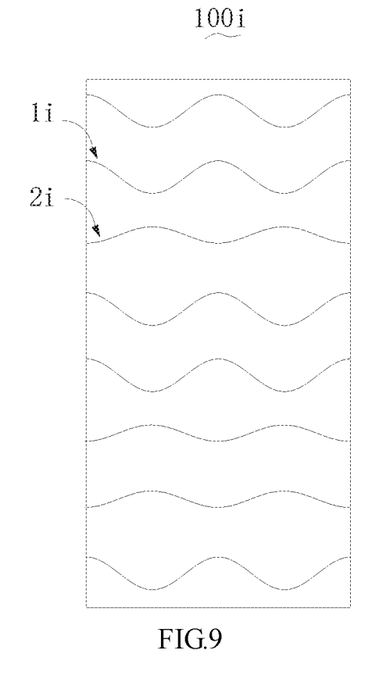
FIG. 9 is yet a further schematic diagram of the arrangement of the optical units of the optical element of this disclosure.

Referring to FIG. 9, an optical element 100i is different from the optical element 100f in that first optical units 1i and second optical units 2i are randomly arranged.

Figure 10:
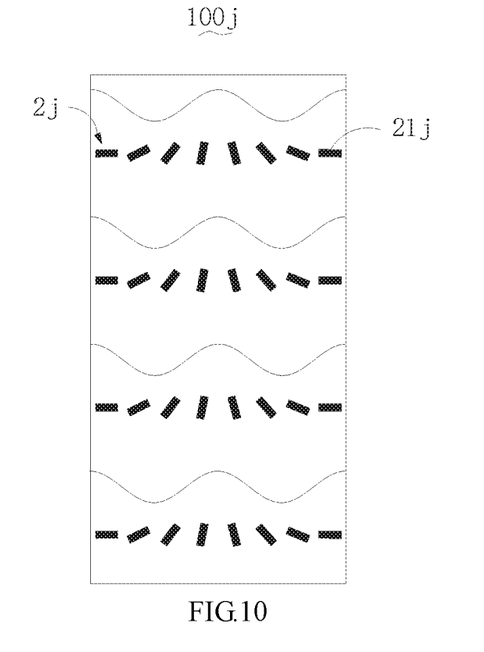
FIG. 10 is yet a further schematic diagram of the arrangement of the optical units of the optical element of this disclosure.

Referring to FIG. 10, an optical element 100j is different from the optical element 100f in that a second optical structure 21j of a second optical unit 2j is a small short-line group. The small short-line group includes small short lines, the small short lines are linear cylindrical mirrors. Central points of the small short lines are located on a straight line, and the small short lines are offset from respective central points, offset angles being from 0 degree to 180 degrees.

Figure 11:
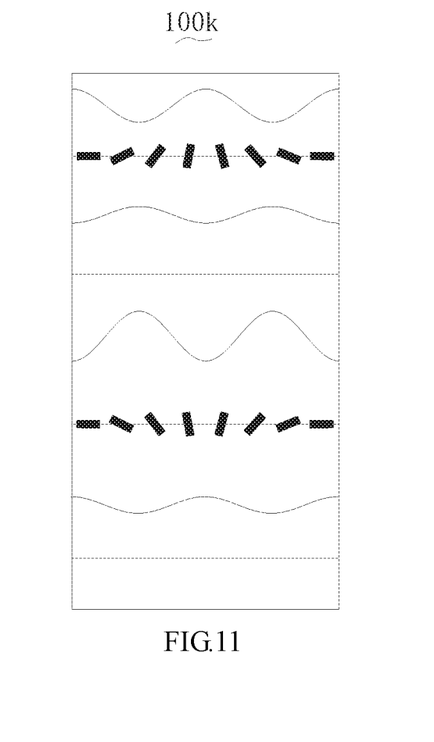
FIG. 11 is yet a further schematic diagram of the optical element of this disclosure.

Referring to FIG. 11, all optical units of an optical element 100k are different. Optical structures of the optical element include linear cylindrical mirrors, curved lenses, small short line groups. Widths of the linear cylindrical mirrors are different, curvatures of the curved lenses are different, and there are differences between offset angles of the small short line groups. Different optical units are sequentially arranged, or are randomly arranged.

The optical element of this disclosure may produce relatively rich light shadow effects, and when it is applied to decoration, it may enhance a decoration effect. For example, when it is applied to decorate a mobile phone cover plate, aesthetic of the mobile phone cover plate may be enhanced greatly, thereby increasing added value of the mobile phone. The optical element of this disclosure may also be applied to the field of anti-counterfeit, and its rich light shadow effects may increase an anti-counterfeit effect.

For the above targets, features and advantages of the present invention to be understood more easily, embodiments of the present inventions are described above with reference to the accompanying drawings. In the above description, many details are given so that the present invention is fully understood. However, the present invention may be carried out in other implementations than those described above. Similar modifications may be made by those skilled in the art without departing from the concept of the present invention, hence, the present invention is not limited to the above disclosure. And the technical features of the above embodiments may be arbitrarily combined. For the sake of concise description, not all possible combinations of the technical features of the above embodiments are described. However, combinations of the technical features shall be deemed as being within the protection scope of the present invention only if the combinations of these technical features are not contradictory to each other.

The above embodiments are some implementations of the present invention only. Description of these implementations are relatively particular and minute, however, it they should not be understood as limiting the protection scope of the present invention. It should be noted that many variants and modifications may be made by those skilled in the art without departing from the concept of the present invention, and all of these are covered by the present invention. Hence, the protection scope of the present invention shall be covered by the attached claims.

What is claimed is:

1. An optical element, comprising:
   a carrier layer;
   an optical layer disposed at a side of the carrier layer, wherein the optical layer comprises at least two types of optical units, the optical units comprising optical structures producing light shadow effects;

a reflective layer covering the optical layer;
a colored layer covering the reflective layer;
the optical structures comprise one of the following:
two or three types of linear cylindrical mirrors, curved lenses and groups of small short lines; and
a plurality of small short lines, wherein central points of the small short lines in the same optical structure are distributed on a line, a curve, or an arc;
wherein a light shadow effect produced by an optical structure of one type of optical units is different from a light shadow effect produced by an optical structure of another type of optical units.

2. The optical element according to claim 1, wherein the at least two types of optical units are spacedly arranged, or the at least two types of optical units are alternately arranged, or the at least two types of optical units are sequentially arranged, or the at least two types of optical units are regularly arranged, or the at least two types of optical units are randomly arranged.

3. The optical element according to claim 1, wherein one type of optical units in the at least two types of optical units are spacedly arranged in arrangement of another type of optical units, or any two neighboring optical units are different from each other, or the at least two types of optical units are arranged in a predetermined order, or the at least two types of optical units are arranged in a predetermined regularity.

4. The optical element according to claim 1, wherein the optical structures are of linear cylindrical mirrors or curved lenses.

5. The optical element according to claim 4, wherein two neighboring curved lenses are disposes so that they are mirror images of each other.

6. The optical element according to claim 4, wherein a plurality of curved lenses are arranged in a line or in a curve, or a plurality of curved lenses are scattered out.

7. The optical element of claim 4, wherein an interval between neighboring curved lenses is of 0, or a fixed value, or a variable value, and all intervals between curved lenses in the same row are of fixed values, or are gradually variable, or are regularly variable, or are randomly variable.

8. The optical element according to claim 1, wherein the optical structures of the optical units are groups of small short lines comprising a plurality of small short lines.

9. The optical element according to claim 8, wherein the small short lines are linear cylindrical mirrors or curved lenses.

10. The optical element according to claim 9, wherein small short lines in the same optical structure are distributed on a line, a curve, or an arc, or central points of small short lines in the same optical structure are distributed on a line, a curve, or an arc.

11. The optical element according to claim 10, wherein the small short lines in the same optical structure are arranged offset from the horizontal direction, or the small short lines in the same optical structure are arranged offset from their respective central points.

12. The optical element according to claim 10, wherein offset angles of a number of small short lines in the same optical structure are identical, gradually variable, incrementally increasing, regularly variable, or randomly variable.

13. The optical element according to claim 11, wherein the offset angles of at least a part of small short lines of optical structures of different optical elements are different.

14. The optical element according to claim 1, wherein optical structures of a plurality of optical elements comprise one, two or three types of linear cylindrical mirrors, curved lenses and small short lines.

15. The optical element according to claim 14, wherein at least one parameter of widths, or heights, or cross-sectional shapes, of linear cylindrical mirrors of optical structures of different optical elements are different.

16. The optical element according to claim 14 wherein at least one parameter of widths, or heights, or curvatures, or cross-sectional shapes, of curved lenses of optical structures of different optical elements are different.

17. The optical element according to claim 14, wherein at least one parameter of widths, or heights, or offset angles, or numbers, or cross-sectional shapes, of groups of small short lines of optical structures of different optical elements are different.

18. A mobile phone cover plate, wherein it comprises the optical element as claimed in claim 1.

19. A mold for manufacturing an optical element as claimed in claim 1, wherein the mold comprises at least two types of arranged texture units, the texture units comprising texture structures, and different texture units comprising different texture structures.

* * * * *